United States Patent [19]
Raidel

[11] 3,912,294
[45] Oct. 14, 1975

[54] VEHICLE SUSPENSION ASSEMBLY

[76] Inventor: John E. Raidel, Rte. 9 Box 400-M, Springfield, Mo. 65804

[22] Filed: June 17, 1974

[21] Appl. No.: 480,213

[52] U.S. Cl. .................... 280/104.5 A; 267/15 R
[51] Int. Cl.² .................................... B60G 19/02
[58] Field of Search...267/15 R; 280/124 F, 104.5 A; 180/24.02, 22 DE

[56] References Cited
UNITED STATES PATENTS

| | | | |
|---|---|---|---|
| 1,702,809 | 2/1929 | Brown | 280/104.5 |
| 2,137,699 | 11/1938 | Price | 280/104.5 |
| 3,794,344 | 2/1974 | Raidel | 267/15 R |

*Primary Examiner*—Philip Goodman
*Attorney, Agent, or Firm*—Rogers, Ezell & Eilers

[57] ABSTRACT

A vehicle suspension assembly comprising a torque beam, means for pivotally mounting the forward end of the torque beam from the vehicle chassis, means for mounting a vehicle axle to the other end of the torque beam, leaf spring means, and means for mounting the leaf spring means for resiliently biasing the torque beam against upward pivotal movement.

Inherent in the assembly design are means for easily providing a vehicle axle lift mechanism which includes a bolster beam, means associated with the bolster beam for mounting its rearward end to the rearward end of the torque beam, with the bolster beam extending beneath the forward pivotal mounting means of the torque beam, and extensible actuating means mounted between the forward end of the bolster beam and the vehicle chassis.

11 Claims, 9 Drawing Figures

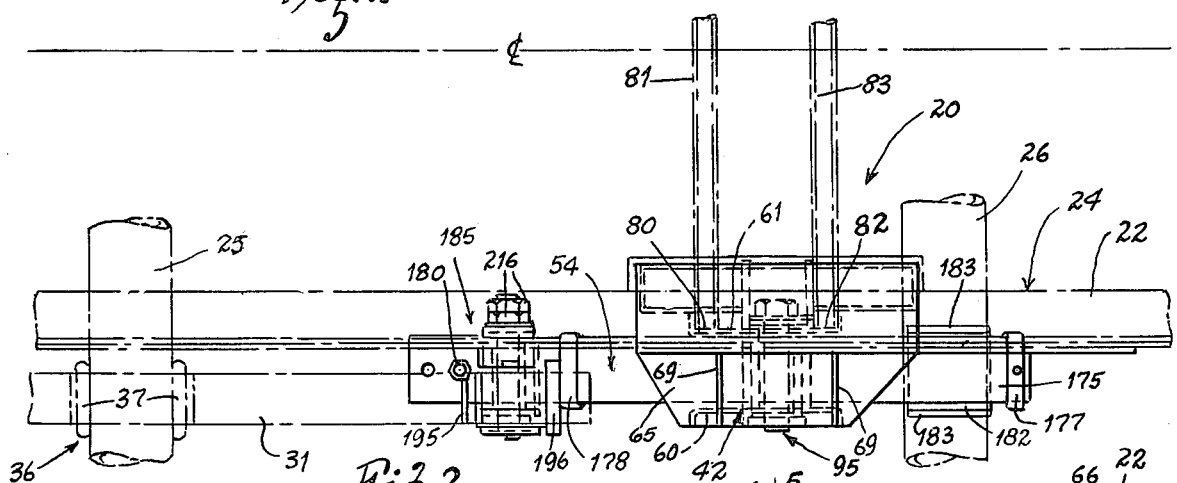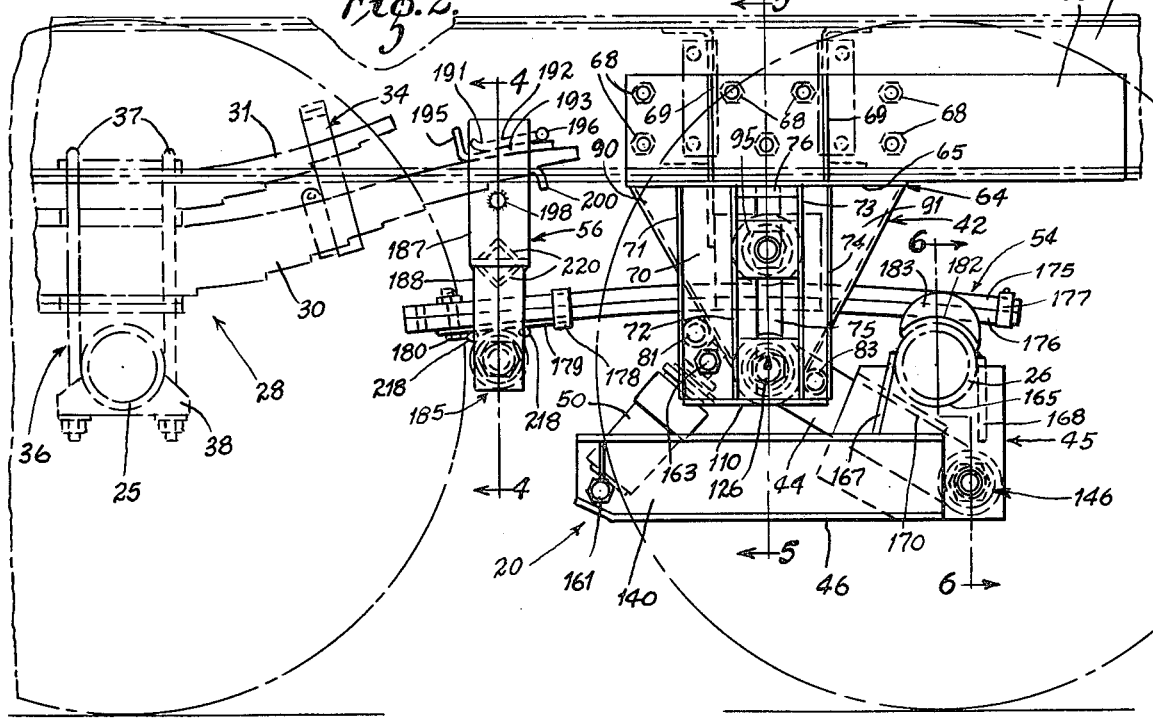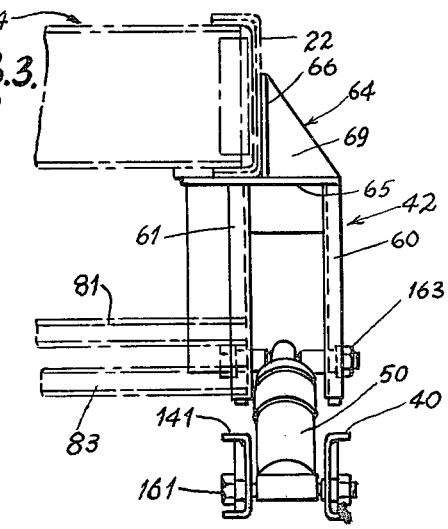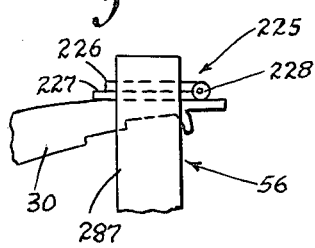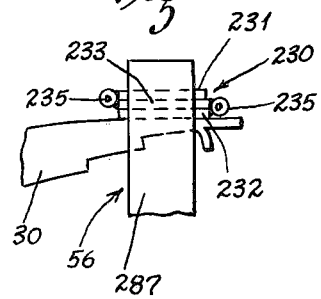

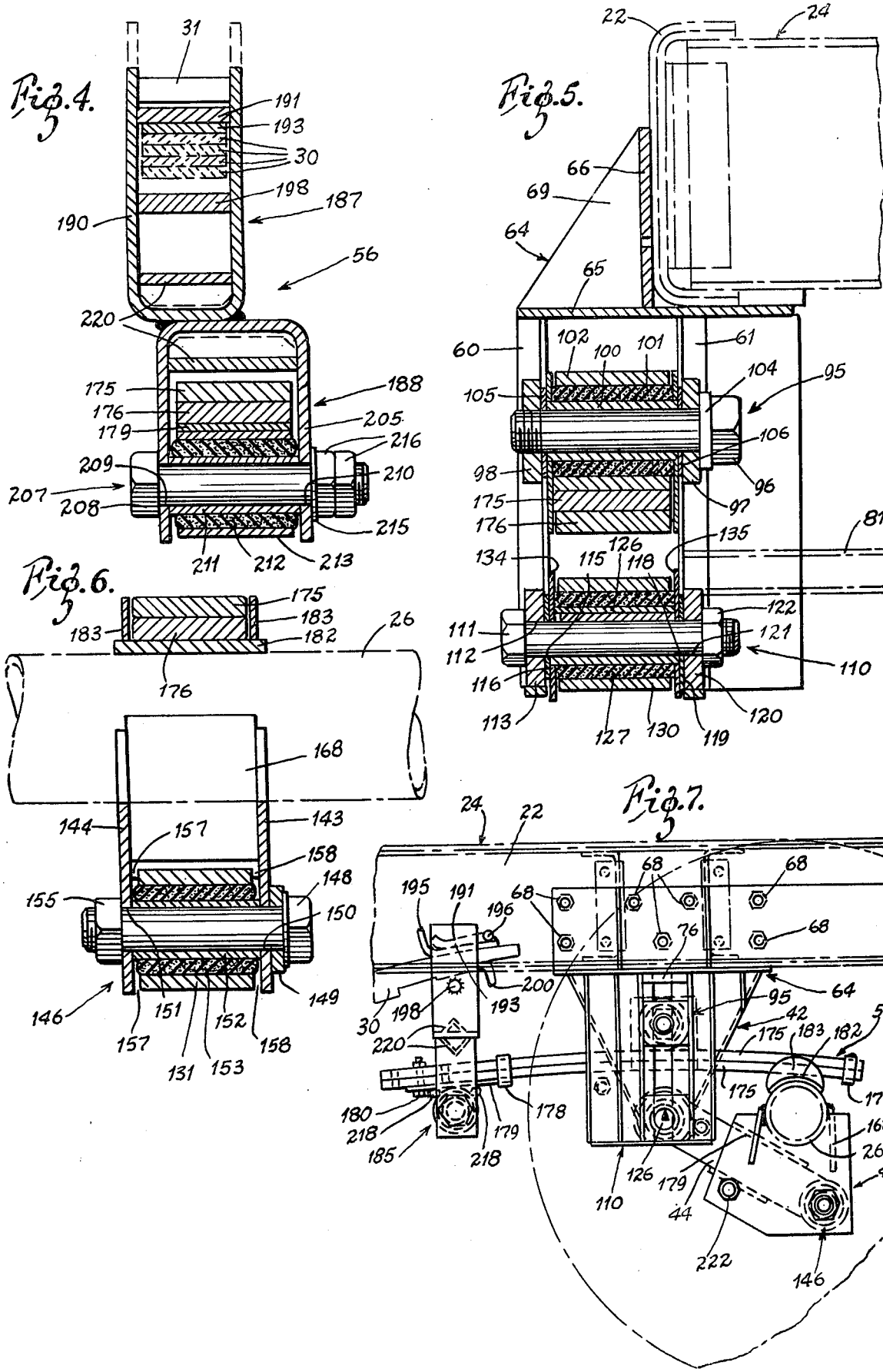

VEHICLE SUSPENSION ASSEMBLY

SUMMARY OF THE INVENTION

This invention relates to a vehicle suspension assembly and particularly to such an assembly for use on a trailing axle of a vehicle and which combines the exceptionally stable ride provided by means of a pivotally mounted torque beam with means for optionally providing an axle lift mechanism, which mechanism may be installed or removed without disturbing the suspension function of the assembly.

The suspension assembly of this invention includes a hanger assembly depending from the side of the vehicle chassis. The forward end of a torque beam is pivotally mounted about a bushing assembly mounted in the hanger assembly, the torque beam extending rearwardly with its rearward end mounted about another bushing assembly located in an axle mounting. A vehicle axle is mounted to the axle mounting. A leaf spring has a center portion thereof bearing upwardly against a first bearing assembly mounted in the hanger assembly above the bushing assembly at the forward end of the torque beam. The rearward end of the leaf spring bears downwardly on the vehicle axle, and the forward end of the leaf spring is loaded to bear downwardly on a second bearing assembly.

Where the suspension asembly of this invention is used on a trailing axle of the vehicle, the second bearing assembly at the forward end of the leaf spring is mounted in a shackle having a third bearing assembly mounted above the second. A forward axle of the vehicle is resiliently mounted to the vehicle chassis by means of a second leaf spring having its rearward end bearing upwardly under vehicle load against the third bearing assembly. Means are provided for mounting the forward end of the second leaf spring in fixed relation to the vehicle chassis.

The axle lifting mechanism of this invention generally comprises a bolster beam having its rearward end rigidly mounted to the axle mounting bracket, the bolster beam extending beneath the hanger assembly, such that the angle between the torque beam and bolster beam is limited to a maximum in magnitude, and extensible actuating means mounted between the forward end of the bolster beam and the hanger assembly, whereby extension of the actuating means produces a lifting of the trailing axle.

Thus, it is a primary feature of this invention to provide a pivotally mounted torque beam design which gives exceptional stability in combination with a leaf spring arrangement for particular use as a trailing axle suspension. The unique design further provides for the optional use of an axle lifting mechanism which can be easily installed or removed without affecting the suspension function of the assembly.

Also provided are means for preventing the tendency of the axle to rotate under the braking forces of the vehicle, and for permitting oscillation of the axle about the longitudinal axis of the torque beam which occurs when one end of the axle moves up or down relative to the other.

These and other features of the invention are apparent from the drawings and detailed description to follow.

DESCRIPTION OF THE DRAWINGS

FIG. 1 is a top plan view of a vehicle suspension assembly of this invention as used on a trailing axle;

FIG. 2 is a side elevation view of the suspension assembly of FIG. 1;

FIG. 3 is a left end elevation view of the trailing axle suspension as shown in FIGS. 1 and 2;

FIG. 4 is an enlarged view in section taken generally along the line 4—4 of FIG. 2;

FIG. 5 is an enlarged view in section taken generally along the line 5—5 of FIG. 2;

FIG. 6 is an enlarged view in section taken generally along the line 6—6 of FIG. 2;

FIG. 7 is a view similar to FIG. 2 and showing another embodiment of this invention; and FIGS. 8 and 9 are partial views showing alternate means for mounting the rearward end of a forward axle leaf spring when used with the suspension of this invention as shown in FIGS. 2 and 7.

DETAILED DESCRIPTION OF PREFERRED EMBODIMENTS:

Referring generally to FIGS. 1 and 2 of the drawing, there is shown a suspension assembly 20 of this invention mounted to a side member 22 of a vehicle chassis 24. The trailing axle 26 of the vehicle is mounted to the suspension assembly 20 below the chassis 24, and the forward axle 27 of the vehicle is mounted to a suspension assembly 28 below the chassis 24, in a manner to be described.

It is to be understood that the suspension assemblies 20 and 28 are duplicated on both sides of the chassis with the axles 25 and 26, as well as the chassis 24, being similarly connected to both assemblies. Therefore, only the left side assemblies will be described, so that in viewing FIG. 2, forward motion of the vehicle is to the left.

The forward axle assembly 28 will only be generally described since it is of a type commonly known in the art. Thus the front axle assembly 28 includes generally parallel leaf springs 30 and 31 with the leaf spring 31 being somewhat smaller and shorter, and located above, the leaf spring 30. The rear end of the leaf spring 31 is attached in spaced relation to the leaf spring 30 by means of a shackle assembly 34. The rear end of the leaf spring 30 is mounted in a manner to be hereinafter described.

The axle 25 is mounted to the leaf springs 30 and 31 at their centers by means of an axle bracket 36 including U-bolts 37 which fit over the top of the spring 31 and downwardly through an axle saddle 38 in a manner commonly known in the art.

The forward end of the spring 31 is similarly mounted to the spring 30 by means of another shackle member similar to the shackle 34, and the forward end of the spring 30 is mounted to the chassis 24 in a commonly known manner, such as by means of a suitable hanger as shown in U.S. Pat. No. 3,614,123.

The principle components of the axle suspension assembly 20 are a hanger assembly 42 suspended from the side member 22, a torque beam 44 having one end pivotally connected to the hanger assembly and its other end connected to axle mounting bracket 45. One end of a bolster beam 46 is mounted to the axle bracket 45, and the axle 26 is mounted to the axle bracket 45 above the torque beam 44. The bolster beam 46 extends generally horizontally beneath the hanger assembly 42. An extensible actuating device 50, preferably a hydraulic cylinder, is connected between the other end of the bolster beam and the hanger assembly 42. A leaf spring 54 extends through the hanger assembly 42 and has a forward end extending through a shackle assembly 56 forward of the hanger assembly 42, and a rearward end bearing downwardly on the axle 26 rearwardly of the hanger assembly 42, as will be more fully described.

The hanger assembly 42 (FIGS. 2 and 5) comprises a pair of extruded hanger rails 60 and 61, the upper ends of which are welded to a hanger bracket 64. The hanger bracket 64 has horizontal and vertical members 65 and 66, respectively, is fastened by a plurality of bolts 68 to the chassis side member 22, and is suitably reinforced with gusset plates 69.

Each of the hanger rails 60 and 61 is formed with a face plate 70 with vertical webs 71, 72, 73, and 74, and has a central vertical slot 75. A reinforcing plate 76 is welded across the top of the slot 75 of each of the rails 60 and 61. One end 80 of a brace member 81 is welded to the face plate 70 between the webs 73 and 74. The other ends of the brace members 81 and 83 are welded to the corresponding hanger rail of the right air suspension assembly (not shown) at the opposite side of the vehicle.

Flanged triangular reinforcing plates 90 and 91 are welded to the hanger rail 60 and the horizontal member 65. Similar plates are welded to the hanger rail 61.

A bearing assembly 95 is mounted between the hanger rails 60 and 61 and comprises a bolt 96 tightened against a square block 97 and threaded into another square block 98. The flanges 72 and 73 permit the blocks to slide but prevent them from rotating. The bolt extends within the slots 75. A metal sleeve 100 is rotatably mounted on the shank of the bolt 96. A rubber bushing 101 surrounds and is bonded to the sleeve 100. Another sleeve 102 is bonded to the outer surface of the rubber bushing 101. The bearing assembly 95 also includes a suitable lock washer 104 and spacer plates 105 and 106.

Beneath the bearing assembly 95 and spaced therefrom is mounted a bushing assembly 110 between the rails 60 and 61 as best shown in FIG. 5. The bushing assembly 110 comprises a bolt 111 extending through a hole 112 in a plate 113 positioned between the webs 72 and 73 and bearing against the face plate 70 of the rail 60. The shank of the bolt 111 further extends through a hole 115 in a narrower plate 116 which is welded to the inner face of the plate 113 and rides within the slot 75 of the hanger rail 60, and through a hole 118 in another narrow plate 119 that rides within the slot 75 of the hanger rail 61, and which is welded to the inner face of a plate 120. The plate 120 is like the plate 113 but is positioned between the webs 72 and 73, and bears against the face plate 70, of the rail 61. The shank of the bolt 111 extends through a hole 121 of the plate 120. A nut 122 is used to tighten the bushing assembly 110 in place.

The bolt 111 has a cam member 125 which projects to one side and acts as an eccentric. An arrow 126 (FIG. 2) is drawn or stamped on the face of the head of the bolt 111 and points to the central high rise of the cam eccentric 125. A metal sleeve 126 surrounds the shank and cam eccentric 125, and a rubber bushing 127 surrounds the sleeve 126. The purpose of the eccentric bolt is to provide means for aligning the axle in the manner described in U.S. Pat. No. 3,510,149 incorporated herein by reference. Once the vertical location of the bushing assembly 110 has been selected within the hanger assembly 28 as described in U.S. Pat. No. 3,510,149, the plates 113 and 120 are welded in place.

The torque beam 44 is tubular and terminates at its forward end in a sleeve member 130 and at its rearward end in a sleeve member 131. The sleeve member 130 surrounds the rubber bushing 127 of the bushing assembly 110 for pivotal movement thereabout. Metallic washers 134 and 135 surround the sleeve 126 and are located at opposite ends of the bushing 127 and the sleeve member 130 to provide a relatively tight fit of the sleeve 130 between the hanger rails 60 and 61, thus prohibiting any appreciable movement of the sleeve 130 back and forth between the hanger rails 60 and 61 and prohibiting any appreciable rotation of the torque beam 44 about its longitudinal axis to insure maintenance of proper wheel tracking and alignment as the vehicle rounds corners and the like.

The bolster beam 46 is comprised of two parallel generally U-shaped members 140 and 141 (FIG. 3) spaced an appropriate distance apart so as to allow the rearward portion of the torque beam 44 to move therebetween. At the rearward end of the bolster beam 46 is mounted a pair of parallel vertical plates 143 and 144 welded to the inside surfaces of, and extending upwardly and rearwardly from, the members 140 and 141, respectively, of the bolster beam 46.

Another bushing assembly 146 is located between the plates 143 and 144 just rearwardly of the rearward end of the bolster beam 46. The bushing assembly 146 (FIG. 6) includes a bolt 148, the shank of which passes through a washer 149, a hole 150 in the plate 143, and a hole 151 in the plate 144. A sleeve 152 surrounds the shank of the bolt between the plates 143 and 144, and a rubber bushing 153 surrounds the sleeve 152. The sleeve 131 of the torque beam 44 surrounds the rubber bushing 153. A nut 155 is secured to the threaded end of the bolt 148 to hold the bushing assembly 146 in place.

It will be noted that there are no washers in the bushing assembly 146 such as the washers 134 and 135 in the bushing assembly 110, leaving spaces 157 and 158 between the ends of the sleeve 131 and the plates 143 and 144. This permits oscillation of the axle about the longitudinal axis of the torque beam as where one end of the axle moves up or down under load with respect to its other end, all of which is fully described in U.S. Pat. No. 3,794,344 incorporated herein by reference.

The bolster beam 46 extends beneath and forward of the hanger assembly 42. One end of the cylinder 50 is mounted at the forward end of the bolster beam 46 between the members 140 and 141 by means of a suitable nut and bolt assembly 161. The other end of the cylinder 50 is mounted between the hanger rails 60 and 61 forward of the bushing assembly 110 by means of another suitable nut and bolt assembly 163. The cylinder 50 is of any suitable type commonly known in the art, and preferably is hydraulically operated through the use of suitable controls and feed lines (not shown).

The axle 26 is mounted to the rearward end of the bolster beam 46 by means of the axle mounting bracket 45 that straddles the torque beam 44. The axle bracket 45 includes the pair of parallel vertical plates 143 and 144 welded to the inside surfaces of the members 140 and 141, respectively, of the bolster beam 46 as heretofore explained. Each of the plates 143 and 144 has a semicircular shaped recess 165 of approximately the same radius as the axle 26. The axle 26 is secured in the semicircular shaped recesses 165 such as by welding. To add side rigidity to the axle mount 45, on each side of the axle there are reinforcing plates 167 and 168. The plates 167 are mounted outside the plates 143 and 144 and are secured at their lower ends to the plates 143 and 144 and the tops of the members 140 and 141 of the bolster beam 46, and at their tops to the axle such as by welding. The plate 168 is located between the plates 143 and 144, and is mounted at its lower end to the plates 143 and 144 and at its top to the axle also by welding. Hence, the axle bracket 160 provides a very rigid and secure support for the axle on the bolster beam 32.

While the axle has been described as mounted over the beam 44, it could obviously be mounted under the beam 44 to accommodate lower axle height requirements.

Also mounted between the vertical parallel plates 143 and 144 is a stop plate 170 located just forward of the axle 26, which axle is located just forward of the bushing assembly 146, and oriented generally parallel to the longitudinal axis of the torque beam 44. The plate 170 bears downwardly on top of the torque beam 44 under axle load. Its purposes are to prevent any tendency for the axle to rotate when the brakes are applied with the vehicle moving in the forward direction, to limit the pivotal movement of the torque beam relative to the bolster beam, so as to establish a maximum angle therebetween to thereby support the axle under load and during lifting of the axle, and to reinforce the axle bracket 48.

The leaf spring 54 extends between the hanger rails 60 and 61 of the hanger bracket 42 with the upper surface of the spring resting against the sleeve 102 of the bearing assembly 95. The particular leaf spring shown has two leaf sections 175 and 176 held together at its rearward end by a clamp 177 and at its forward end by a clamp 178, a bearing plate 179 held at one end by the clamp 178, and by a nut and bolt assembly 180, which bolt extends through aligned holes in the leaf sections to hold the leaf spring longitudinally aligned.

The rearward end of the leaf spring 54 rests on a bearing pad 182, having side members 183 to limit side movement of the spring 54, which is welded to the top side of the axle 26. The forward end of the leaf spring 54 bears downwardly on a bearing assembly 185 mounted at the lower end of the shackle assembly 56.

As best shown in FIGS. 2 and 4, the shackle assembly 56 has an upper section 187 and a lower section 188. The upper section 187 includes a generally U-shaped bracket 190 and a wear plate 191 welded between the legs of the bracket 190 near the top. The wear plate 191 has a rounded bottom surface 192. A stop plate 193 is welded to the top side of the leaf spring 30 near its rearward end and at a location within the bracket section 187. The stop plate 193 has an upturned forward end 195 and a retainer 196 secured to its rearward end just in back of the rear edge of the wear plate 191. Another retainer 198 is welded between the legs of the bracket section 187 just beneath the leaf spring 30, for use where the leaf spring 30 has a hook 200, which, in coaction with the retainer 198, limits the forward movement of the spring 30 relative to the shackle assembly 56.

The lower section 188 of the shackle assembly 56 includes a generally inverted U-shaped bracket 205, the top of which is welded to the bottom of the bracket 190 as best shown in FIG. 4. A bearing assembly 207 is mounted at the lower end of the bracket 205 and includes a bolt 208, the shank of which extends through a hole 209 in the outside leg of the bracket 205, and a hole 210 in the inside leg of the bracket 205. A sleeve 211 surrounds the shank of the bolt between the legs of the U-shaped bracket 205, and a rubber bushing 212 surrounds and is bonded to the sleeve 211. An outer sleeve 213 surrounds and is bonded to the rubber bushing 212. A lock washer 215 and nuts 216 at the threaded end of the bolt 208 hold the bearing assembly 207 in place. The forward end of the leaf spring 54 extends between the legs of the bracket 205 with the wear plate 179 resting on the sleeve 213 of the bearing assembly 207. Retainer pins 218 are secured to the bearing plate 179 next to the bearing assembly 185 to limit longitudinal movement of the spring 54. Reinforcing plates 220 are welded within the U-shaped brackets 190 and 205 near where they are joined to help support the structure.

FIG. 7 shows another embodiment of the invention which is identical to the first-described embodiment except that the bolster beam 46 and actuating cylinder 50 are removed, thus removing the axle lift capability of the trailing suspension assembly 20, and a stop pin 222 is mounted between the plates 143 and 144 just forward of the axle 26 and in position directly beneath or slightly below the torque beam 44. Its purpose is to prevent any tendency for the axle to rotate such as when the brakes are applied with the vehicle moving in the reverse direction.

In FIGS. 8 and 9 there are shown alternate means for attaching the rearward end of the forward leaf spring 30 to the shackle assembly 56. In FIG. 8 there is shown a single hinge 225 having a top plate 226 welded to the upper portion 287 of the shackle 56, and a lower plate 227 welded to the top of the leaf spring 30. The plates 226 and 227 are hinged at 228.

In FIG. 9 there is shown a double hinge 230 having a top plate 231 welded to the upper portion 287 of the shackle assembly 56, and a bottom plate 232 welded to the top of the leaf spring 30. A middle plate 233 is hinged to the top plate 231 and bottom plate 232 as shown at 235.

In the alternate connecting means of FIGS. 8 and 9, the single hinge 225 of FIG. 8, or the double hinge 230 of FIG. 9, open and close as load conditions on the vehicle vary.

It should be noted that while the suspension 20 of this invention has been described in combination with the forward axle suspension 28 best shown in FIG. 2, the suspension could also be used as a single axle suspension by rigidly attaching the shackle assembly 56 to the vehicle chassis.

Operation

In the suspension assemblies shown in all the figures, loads applied to either axle are partially distributed to the other axle in a manner that results in exceptional stability. As can be seen, load applied to the forward axle 25, which tends to raise the axle 25 relative to the chassis 22, causes an upward force to be applied by the rearward end of the spring 30 and its associated stop plate 193 against the wear plate 191 to urge the shackle assembly 56 upwardly. This in turn causes the bearing assembly 185 to bear upwardly against the forward end of the leaf spring 54, causing the center portion of the spring 54 to bear upwardly against the bearing assembly 95 and the rearward end of the spring 54 to bear downwardly on the axle 26, thereby distributing some of the load on the axle 25 to the axle 26 in a manner which tends to even the load on the axles. As load is applied downwardly on the axle 26 this load is distributed in part to the axle 25 in the same manner.

As the axle 26 moves up under load relative to the chassis 22, the torque beam 44 pivots in a counterclockwise direction as viewed in FIGS. 2 and 7 about the bushing assemblies 110 with the wear pad 182 of the axle 26 sliding slightly along the lower surface of the leaf spring 54. The stop plate 170, bearing downwardly on the torque beam, supports the axle and prevents rotation of the axle bracket 45 under vehicle load. The stop plate 170 also prevents rotation of the axle 26 when the brakes of the vehicle are applied with the vehicle moving in the forward direction.

In the embodiment of FIG. 7, the pin 222 prevents rotation of the axle 26 such as when the vehicle brakes are applied with the vehicle moving in the reverse direction. In the embodiment of FIGS. 1 through 6, the cylinder 50 acts to prevent such rotation of the axle.

Thus, it is a primary feature of this invention that the torque beam design, which gives exceptional stability, is uniquely adapted for use with a leaf spring arrangement.

Another unique feature of this invention is that it readily allows optional use of an axle lift mechanism as shown in the embodiment of FIGS. 1 through 6. Thus, by the simple addition of the bolster beam 46 and cylinder 50, the trailing axle assembly becomes a lift assembly for lifting the trailing axle out of use as desired.

To operate the trailing axle assembly 20 with the axle lift structure added, the actuating cylinder 50 is operated without positive pressure so that it extends and compresses like a shock absorber to accommodate pivotal movement of the torque beam 44 as the load varies just as with the embodiment of FIG. 7.

To operate the axle lift mechanism of FIGS 1 through 6, the actuating cylinder 50 is pressurized to extend the cylinder. Because the angle of the torque beam 44 relative to the bolster beam 46 is limited in magnitude to a maximum due to the location of the stop plate 170, extension of the cylinder 50 produces counterclockwise rotation of the torque beam 44 about the bushing assembly 110, thereby lifting the axle 26.

As the load conditions on the axles 25 and 26 vary, the leaf springs 30 and 54 are allowed to slide somewhat relative to the wear plate 191, the bearing assembly 95, and the wear plate 182. The retainer 196, the retainer 198 and hook 200, and the retainers 218, prohibit excessive longitudinal movement of the leaf springs 30 and 54.

With the variations of FIGS. 8 and 9, the hinges open and close as the axle loads vary.

Various changes and modifications may be made in this invention, as will be readily apparent to those skilled in the art. Such changes and modifications are within the scope and teaching of this invention as defined by the claims appended thereto.

What is claimed is:

1. A vehicle suspension assembly comprising a hanger assembly attached to and depending from the vehicle chassis, a torque beam, a resilient bushing means mounted to the hanger assembly for pivotally mounted the forward end of the torque beam thereto, means for mounting a vehicle axle to a rearward portion of the torque beam, a bolster beam, means for mounting the rearward end of the bolster beam to the rearward end of the torque beam to maintain a maximum angular position with respect thereto, the bolster beam extending beneath and forward of the hanger assembly, and extensible actuating means connected between the forward end of the bolster beam and the hanger assembly, whereby an extension of the actuating means produces an upward pivotal movement of the torque beam about its pivotal connection at its forward end, a leaf spring means, a bearing means mounted to the hanger assembly above the resilient bushing means at the forward end of the torque beam, said bearing means bearing downwardly on a mid portion of said spring means, and means for applying an upward load on a portion of the leaf spring forward of the bearing means, a portion of the leaf spring rearward of the bearing means bearing downwardly on said axle.

2. The vehicle suspension assembly of claim 1 wherein the maximum angular position between the bolster beam and torque beam is an acute angle.

3. The suspension assembly of claim 1 wherein the means for mounting the rearward end of the torque beam includes resilient bushing means.

4. The suspension assembly of claim 1 including stop means associated with axle movement and which bear against the torque beam to prevent rotation of the axle when the brakes are applied.

5. The vehicle suspension of claim 1 including means permitting oscillation of the vehicle axle relative to the chassis as occurs where one end of the axle moves up or down relative to its other end.

6. The suspension assembly of claim 1 including means associated with the pivotally mounting means at the forward end of the torque beam for aligning the axle.

7. The suspension assembly of claim 1 wherein the upward load applying means includes a shackle assembly, a second vehicle axle located forward of said other axle, second leaf spring means, means for mounting said second axle to said second leaf spring means, means for mounting the rearward end of said second leaf spring means to the shackle assembly, and means for mounting the forward end of said other leaf spring to said shackle assembly.

8. The suspension assembly of claim 7 wherein the shackle assembly further comprises second bearing means bearing upwardly on the forward end of said other leaf spring, and third bearing means bearing downwardly on the rearward end of said second leaf spring.

9. A vehicle suspension assembly comprising a torque beam, means associated with the vehicle chassis for pivotally mounting the forward end of the torque beam thereto, means for mounting a vehicle axle to the torque beam near its rearward end, a leaf spring, means for mounting the leaf spring to resiliently oppose upward pivotal movement of the torque beam, a bolster beam, means for mounting the rearward end of the bolster beam to the rearward end of the torque beam to maintain a maximum angular position with respect thereto, the bolster beam extending beneath and forward of the pivotally mounting means at the forward end of the torque beam, an extensible actuating means, and means for mounting the actuating means between the forward end of the bolster beam and the vehicle chassis, the lower end of the actuating means being forward of its upper end.

10. A vehicle suspension assembly comprising a torque beam, first resilient bushing means associated with the vehicle chassis for pivotally mounting the forward end of the torque beam from the vehicle chassis, an axle mounting bracket, a resilient bushing means mounted in the mounting bracket for mounting the rearward end of the torque beam to the mounting bracket, means for mounting a vehicle axle to the mounting bracket, stop means associated with axle movement and which bear against the torque beam to prevent rotation of the axle when the brakes are applied, leaf spring means, first bearing means associated with the vehicle chassis for bearing downwardly on a mid portion of the spring means, second bearing means, means for mounting the second bearing means to bear upwardly on a portion of the spring means forward of the first bearing means, the rearward end of the leaf spring means bearing downwardly on the vehicle axle.

11. A vehicle suspension assembly comprising a torque beam, means associated with the vehicle chassis for pivotally mounting the forward end of the torque beam thereto, means for mounting a vehicle axle to the torque beam near its rearward end, first leaf spring means, bearing means associated with said vehicle chassis, a central portion of said first leaf spring means bearing upwardly on said bearing means, a rearward portion of said first leaf spring means bearing downwardly on said axle, a shackle assembly, second leaf spring means, means for mounting a second vehicle axle forward of the first vehicle axle to said second leaf spring means, means for mounting the rearward end of said second leaf spring means to the shackle assembly, means for mounting the forward end of said first leaf spring means to said shackle assembly, said shackle assembly mounting means further comprising second bearing means bearing upwardly on the forward end of said first leaf spring means, and third bearing means bearing downwardly on the rearward end of said second leaf spring means, said third bearing means further comprising hinge means for attaching the rearward end of said second leaf spring means to said shackle assembly.

* * * * *